US012227967B2

(12) United States Patent
Dhanvantri et al.

(10) Patent No.: US 12,227,967 B2
(45) Date of Patent: Feb. 18, 2025

(54) HANDLE CATCH ASSEMBLIES

(71) Applicant: Schlage Lock Company LLC, Carmel, IN (US)

(72) Inventors: Achyuta Dhanvantri, Bangalore (IN); Ravi Telang, Bidar (IN); Mark A. Ross, Denver, CO (US); Naresh Paddillaya, Mangalore (IN); Sidharth Ramachandran, Kasaragod District (IN); Ankith Kulal, Mangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/242,270

(22) Filed: Sep. 5, 2023

(65) Prior Publication Data

US 2024/0011323 A1 Jan. 11, 2024

Related U.S. Application Data

(63) Continuation of application No. 17/524,247, filed on Nov. 11, 2021, now Pat. No. 11,746,560.

(51) Int. Cl.

| | |
|---|---|
| ***E05B 3/04*** | (2006.01) |
| ***E05B 1/00*** | (2006.01) |
| ***E05B 3/00*** | (2006.01) |

(52) U.S. Cl.

CPC ................ *E05B 3/04* (2013.01); *E05B 1/003* (2013.01); *E05B 3/003* (2013.01)

(58) Field of Classification Search

CPC ... E05B 3/00; E05B 3/04; E05B 3/003; E05B 1/00; E05B 1/003; E05B 5/00; E05B 13/106

USPC .......................................................... 292/353

See application file for complete search history.

(56) References Cited

U.S. PATENT DOCUMENTS

| | | | | |
|---|---|---|---|---|
| 6,553,799 | B2 * | 4/2003 | Bates | E05B 55/005 70/482 |
| 6,695,365 | B2 * | 2/2004 | Chong | E05B 3/00 292/DIG. 53 |
| 7,143,477 | B2 * | 12/2006 | Dalsing | E05B 3/003 292/336.3 |
| 8,087,273 | B2 | 1/2012 | Liu et al. | |

(Continued)

OTHER PUBLICATIONS

International Search Report; International Searching Authority; International Application No. PCT/US2022/049561; Feb. 22, 2023; 2 pages.

(Continued)

*Primary Examiner* — Nathan Cumar

(74) *Attorney, Agent, or Firm* — Taft Stettinius & Hollister LLP

(57) ABSTRACT

An exemplary catch assembly is configured for installation into a spindle, and generally includes a holder, a first catch, a second catch, and a bias mechanism. The holder is configured for mounting within the spindle. The first catch is mounted for movement relative to the holder between a first projected position and a first depressed position. The second catch is mounted for movement relative to the holder between a second projected position and a second depressed position. The bias mechanism biases the first catch toward the first projected position and biasing the second catch toward the second projected position.

20 Claims, 11 Drawing Sheets

(56) References Cited

U.S. PATENT DOCUMENTS

| | | | | |
|---|---|---|---|---|
| 8,844,330 | B2 * | 9/2014 | Moon | E05B 55/005 292/336.3 |
| 8,904,836 | B2 | 12/2014 | Guo | |
| 10,738,504 | B2 | 8/2020 | Uyeda et al. | |
| 2008/0252086 | A1 * | 10/2008 | Houis | E05B 3/00 292/348 |
| 2018/0283044 | A1 * | 10/2018 | Morstatt | E05B 3/02 |
| 2021/0222465 | A1 | 7/2021 | Cheng | |

OTHER PUBLICATIONS

Written Opinion of the International Searching Authority; International Searching Authority; International Application No. PCT/US2022/049561; Feb. 22, 2023; 9 pages.

* cited by examiner

HANDLE CATCH ASSEMBLIES

CROSS REFERENCE TO RELATED APPLICATIONS

The present application is a continuation of U.S. patent application Ser. No. 17/524,247 filed Nov. 11, 2021 and issued as U.S. Pat. No. 11,746,560, the contents of which are incorporated herein by reference in their entirety.

TECHNICAL FIELD

The present disclosure generally relates to handle catch assemblies, and more particularly but not exclusively relates to lever catch assemblies for a handleset of a lockset.

BACKGROUND

Certain existing handlesets utilize a catch to selectively couple the handle to the spindle. In many handlesets in which the handle is provided in the form of a lever, the handleset can be installed in either of a right-handed orientation and a left-handed orientation. In some existing approaches, the handing of the handleset is set at the time of manufacture such that the customer must know the handing at the time of purchase. For these reasons among others, there remains a need for further improvements in this technological field.

SUMMARY

An example catch assembly is configured for installation into a spindle, and generally includes a holder, a first catch, a second catch, and a bias mechanism. The holder is configured for mounting within the spindle. The first catch is mounted for movement relative to the holder between a first projected position and a first depressed position. The second catch is mounted for movement relative to the holder between a second projected position and a second depressed position. The bias mechanism biases the first catch toward the first projected position and biasing the second catch toward the second projected position. Further embodiments, forms, features, and aspects of the present application shall become apparent from the description and figures provided herewith.

DETAILED DESCRIPTION OF ILLUSTRATIVE EMBODIMENTS

Figure 1:
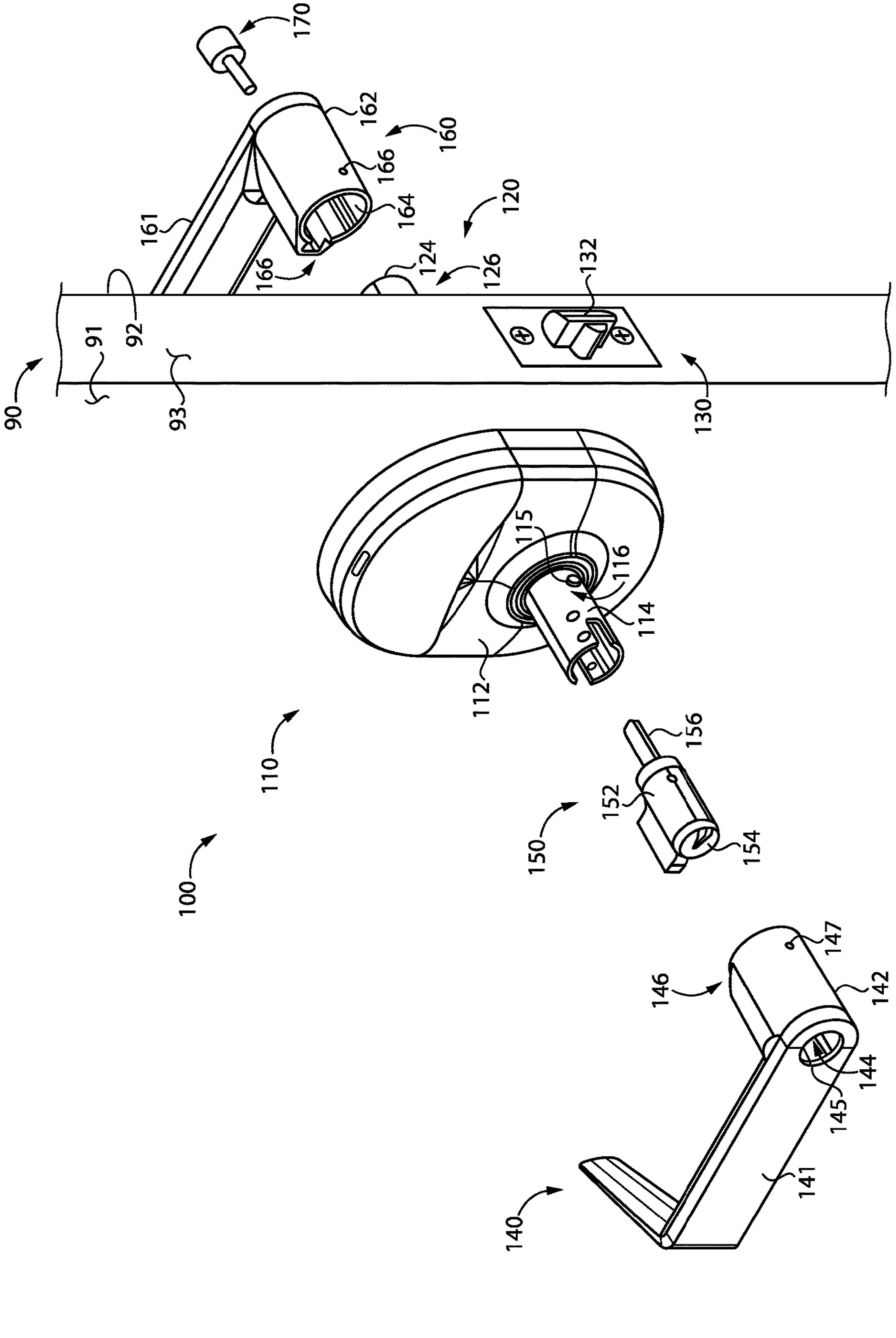
FIG. 1 is an exploded assembly view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is door 90 having a lockset 100 according to certain embodiments mounted thereon. The door 90 generally includes an outer or non-egress side 91, an inner or egress side 92 opposite the non-egress side 91, and a swinging edge 93 extending between and connecting the egress side 92 and the non-egress side 91. The lockset 100 generally includes an outside handleset 110 mounted to the non-egress side 91, an inside handleset 120 mounted to the egress side 92, and a latch mechanism 130 including a latchbolt 132 operable to project beyond the swinging edge 93. As described herein, the lockset 100 has a locked state in which an outside handle 140 is operable to retract the latchbolt 132, and an unlocked state in which the outside handle 140 is inoperable to retract the latchbolt 132.

The outside handleset 110 generally includes an outside escutcheon 112, an outside spindle 114 mounted for rotation relative to the outside escutcheon 112, and an outside catch assembly 116 mounted to the outside spindle 114, and in the illustrated form further includes the outside handle 140 and a lock cylinder 150. As described herein, the outside handle 140 is selectively coupled to the spindle 114 via the catch assembly 116, and the lock cylinder 150 is operable to transition the lockset 100 between its locked state and its unlocked state. The spindle 114 is operably connected with the latch mechanism 130 such that when the lockset 100 is in its unlocked state, rotation of the spindle 114 causes retraction of the latchbolt 132.

As will be apparent from the description herein, the catch assembly 116 generally includes at least one catch and a bias mechanism biasing the at least one catch toward a projected position. With the at least one catch in the projected position, the catch assembly 116 is operable to selectively retain the handle 140 on the spindle 114. In certain embodiments, the catch assembly 116 may be provided as a modular construct configured for installation to the spindle 114 as a modular unit. For example, the catch assembly 116 may be provided in the form of the catch assembly 200 illustrated in FIGS. 2 and 3, the catch assembly 400 illustrated in FIGS. 6 and 7, the catch assembly 600 illustrated in FIGS. 10 and 11, the catch assembly 700 illustrated in FIGS. 12-14, the catch assembly 800 illustrated in FIGS. 15 and 16, the catch assembly 900 illustrated in FIGS. 17 and 18, the catch assembly 1000 illustrated in FIG. 19, the catch assembly 1100 illustrated in FIG. 20, the catch assembly 1200 illustrated in FIG. 21, the catch assembly 1300 illustrated in FIG. 22, the catch assembly 1400 illustrated in FIG. 23, or the catch assembly 1500 illustrated in FIG. 24. It is also contemplated that the catch assembly 116 may not necessarily be a modular construct configured for installation as a single unit. For example, the catch assembly 116 may take the form of the catch assembly 300 illustrated in FIGS. 4 and 5, or the catch assembly 500 illustrated in FIGS. 8 and 9.

The inside handleset 120 generally includes an inside escutcheon, an inside spindle 124 mounted for rotation relative to the inside escutcheon, and an inside catch assembly 126 mounted to the inside spindle 124, and in the illustrated form further includes an inside handle 160 and a lock state selector 170. The inside handle 160 is selectively coupled to the spindle 124 via the catch assembly 126, and the lock state selector 170 is operable to transition the lockset 100 between its locked state and its unlocked state. The spindle 124 is operably connected with the latch mechanism 130 such that rotation of the spindle 124 causes retraction of the latchbolt 132.

As will be apparent from the description herein, the catch assembly 126 generally includes at least one catch and a bias mechanism biasing the at least one catch toward a projected position. With the at least one catch in the projected position, the catch assembly 126 is operable to selectively retain the handle 160 on the spindle 124. In certain embodiments, the catch assembly 126 may be provided as a modular construct configured for installation to the spindle 114 as a modular unit. For example, the catch assembly 126 may be provided in the form of the catch assembly 200 illustrated in FIGS. 2 and 3, the catch assembly 400 illustrated in FIGS. 6 and 7, the catch assembly 600 illustrated in FIGS. 10 and 11, the catch assembly 700 illustrated in FIGS. 12-14, the catch assembly 800 illustrated in FIGS. 15 and 16, the catch assembly 900 illustrated in FIGS. 17 and 18, the catch assembly 1000 illustrated in FIG. 19, the catch assembly 1100 illustrated in FIG. 20, the catch assembly 1200 illustrated in FIG. 21, the catch assembly 1300 illustrated in FIG. 22, the catch assembly 1400 illustrated in FIG. 23, or the catch assembly 1500 illustrated in FIG. 24. It is also contemplated that the catch assembly 126 may not necessarily be a modular construct configured for installation as a single unit. For example, the catch assembly 126 may take the form of the catch assembly 300 illustrated in FIGS. 4 and 5, or the catch assembly 500 illustrated in FIGS. 8 and 9.

The latch mechanism 130 is mounted in a bore formed in the swinging edge 93 of the door 90, and includes the latchbolt 132. The latchbolt 132 has an extended position in which the latchbolt 132 is operable to retain the door 90 in its closed position and a retracted position in which the latch mechanism 130 permits opening of the door 90.

The outside handle 140 generally includes a shank 142 and a grip 141 extending from the shank 142. A chamber 144 is formed within the shank 142 and receives the outside spindle 114, and an opening 145 is formed in a face of the handle 140 to permit access to the lock cylinder 150. Formed on opposite sides of the shank 142 are a pair of recesses 146 through which the catch assembly 116 engages the handle 140 in a manner described in further detail below. While the illustrated handle 140 is provided in the form of a lever, it is also contemplated that the handle 140 may be provided in another form, such as that of a knob.

The lock cylinder 150 is mounted within the spindle 114 and the shank 142, and generally includes a shell 152 rotationally coupled with the spindle 114 and/or the shank 142, a plug 154 mounted for rotation relative to the shell 152, a tailpiece 156 rotationally coupled with the plug 154, and a tumbler assembly operable to selectively prevent rotation of the plug 154 relative to the shell 152. The tumbler assembly is biased toward a blocking state, in which the tumbler assembly prevents rotation of the plug 154 relative to the shell 152. When a proper key is inserted into the plug 154, the tumbler assembly moves to an unblocking state, in which the tumbler assembly permits rotation of the plug 154 relative to the shell 152. Rotation of the plug 154 causes a corresponding rotation of the tailpiece 156, which moves one or more internal components of the lockset 100 to transition the lockset 100 between its locked state and its unlocked state.

The inside handle 160 is substantially similar to the outside handle 140, and includes a shank 162 and a grip 161 extending from the shank 162. A chamber 164 is formed within the shank 162 and receives the inside spindle 124, and an opening is formed in a face of the handle 160 to permit access to the lock state selector 170. Formed on opposite sides of the shank 162 are a pair of apertures 166 through which the catch assembly 126 may be accessed to permit decoupling of the handle 160 from the spindle 124 in a manner described in further detail below. While the illustrated handle 160 is provided in the form of a lever, it is also contemplated that the handle 160 may be provided in another form, such as that of a knob.

The illustrated lock state selector 170 is mounted in the inside handle 160 such that a user is able to transition the lockset 100 between its locked state and its unlocked state from the egress side 92 of the door 90. In the illustrated form, the lock state selector 170 is provided in the form of a pushbutton that places the lockset 100 in the locked state when depressed. It is also contemplated that the lock state selector 170 may take another form, such as that of a turnbutton. In certain embodiments, such as those in which the lockset 100 includes an electronic locking mechanism, the lock state selector 170 may not necessarily be mounted in the inside handle 160.

Figure 2:
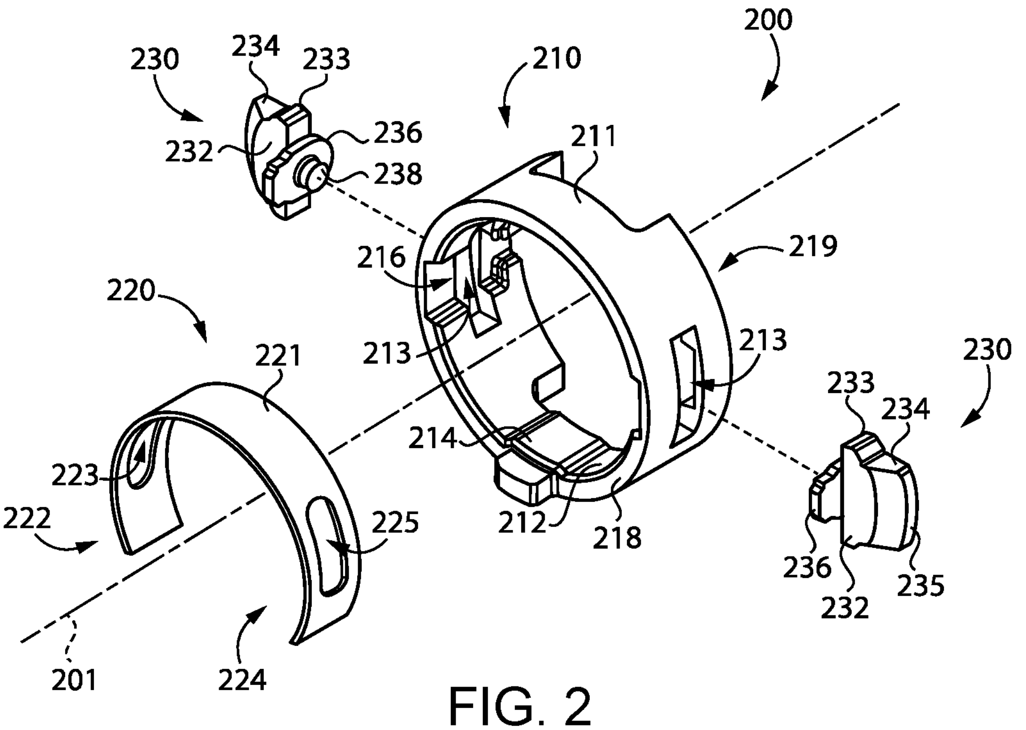
FIG. 2 is an exploded assembly view of a catch assembly according to certain embodiments.

With additional reference to FIG. 2, illustrated therein is a catch assembly 200 according to certain embodiments. The catch assembly 200 may, for example, be utilized as the catch assembly 116 of the outside handleset 110 and/or the catch assembly 126 of the inside handleset 120. Thus, while certain descriptions of the catch assembly 200 will be made with reference to the outside handleset 110, it should be appreciated that at least some such descriptions may be equally applicable to embodiments in which the catch assembly 200 is installed to the inside handleset 120.

The catch assembly 200 generally includes a holder 210 configured for mounting within the spindle 114, a bias mechanism 220 mounted within the holder 210, and a pair of catches 230 mounted to the bias mechanism 220 and extending through the holder 210. As described herein, the catch assembly 200 is configured to selectively couple the handle 140 to the spindle 114 when the handle 140 is in either of two orientations relative to the spindle 114. While not specifically illustrated in FIG. 2, it should be appreciated that the catch assembly 200 may further include a retention mechanism configured to discourage removal of the catches 230, such as the retainers 840 illustrated in FIGS. 15 and 16, or the retainer 940 illustrated in FIGS. 17 and 18.

The holder 210 is configured for mounting within the spindle 114, extends along a longitudinal axis 201 of the catch assembly 200, and has an outer periphery 211, an inner periphery 212, and a pair of holder openings 213 extending through the body of the holder 210. While other forms are contemplated, in the illustrated embodiment, the openings 213 are diametrically opposite one another. Formed on the inner periphery 212 are a pair of longitudinal channels 216, each of which intersects a corresponding one of the openings 213. The holder 210 has a first end face 218 and an opposite second end face 219, and in the illustrated form, each channel 216 extends from each of the first end face 218 and the second end face 219. In certain embodiments, ridge 214 may be formed on the inner periphery 212 of the holder 210 to restrict circumferential rotation of the bias mechanism 220.

In the illustrated form, the bias mechanism 220 comprises a single arcuate leaf spring 221. The leaf spring 221 is arcuate about the longitudinal axis 201, and includes a first end portion 222 and a second end portion 224 opposite the first end portion 222. The first end portion 222 includes a first slot 223, and the second end portion 224 includes a second slot 225.

Each catch 230 includes a body portion 232, a tab 234 projecting radially outward from the body portion 232, a plate 236 positioned radially inward of the body portion 232, and a post 238 projecting radially inward from the plate 236. The tab 234 is sized and shaped to extend through the opening 213, and in the illustrated form comprises a chamfer 235. The plate 236 is sized and shaped to be received in the channel 216 to limit circumferential movement of the catch 230 relative to the holder 210. The post 238 is sized and shaped to be inserted in each and either of the slots 223, 225.

During assembly of the catch assembly 200, each catch 230 is positioned within the holder 210, and pushed radially outward such that the tabs 234 extend through the openings 213 and project beyond the outer periphery 211 of the holder 210. The plates 236 are seated in the channels 216 to thereby prevent the catch 230 from exiting the corresponding opening 213 in the radially-outward direction. The end portions 222, 224 of the leaf spring 221 are then pushed toward each other such that the leaf spring 221 is slightly compressed, and the leaf spring 221 is inserted into the holder 210 such that each slot 223, 225 aligns with a corresponding post 238. The leaf spring 221 is then released such that the end portions 222, 224 flex away from one another, thereby causing the slots 223, 225 to receive the posts 238.

With the catch assembly 200 assembled, the leaf spring 221 engages the inner periphery 212 of the holder 210 and biases the catches 230 radially outward toward projected positions thereof. The catches 230 can be moved to depressed positions by urging the tabs 234 radially inward against the biasing of the leaf spring 221.

Figure 3:
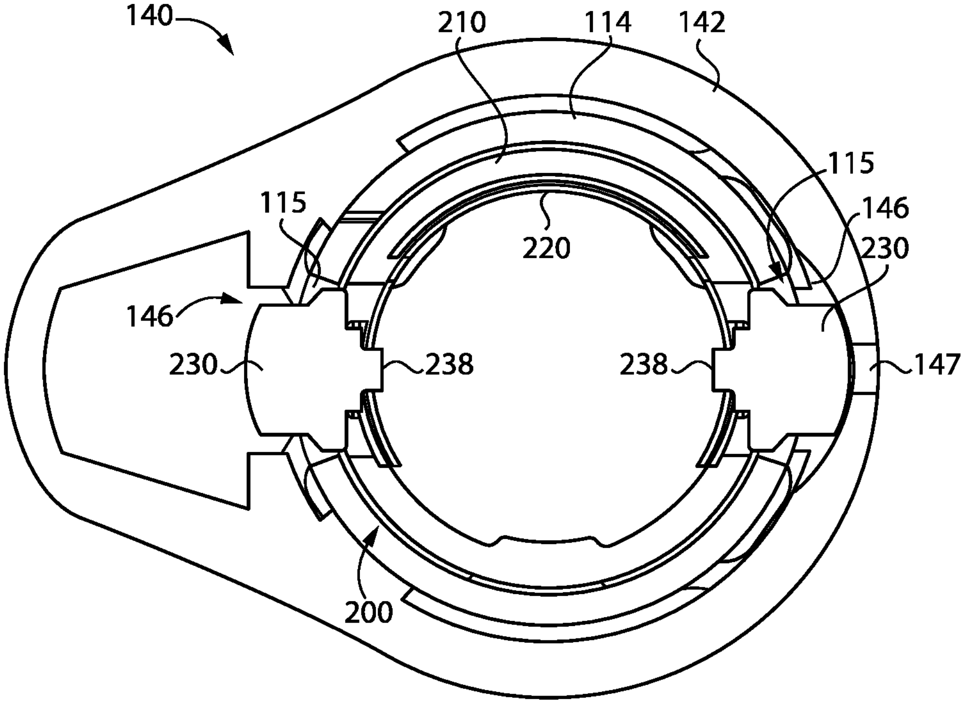
FIG. 3 is a cross-sectional view of the catch assembly of FIG. 2 installed to the lockset illustrated in FIG. 1.

With additional reference to FIG. 3, illustrated therein is a cross-sectional view of outside handleset 110 with the catch assembly 200 installed. In the interest of clarity, certain features of the outside handleset 110 are omitted from the illustration of FIG. 3. During assembly of the handleset 110, the assembled catch assembly 200 is installed to the spindle 114, after which the handle 140 is installed to the spindle 114.

Installation of the catch assembly 200 to the spindle 114 generally involves depressing the catches 230 as described above, and inserting the catch assembly 200 into the spindle 114. During such insertion, the inner periphery of the spindle 114 retains the catches 230 in the depressed positions until each catch 230 aligns with a corresponding opening 115 in the spindle 114, at which point the biasing of the bias mechanism 220 urges the catches 230 radially outward to their projected positions such that the tabs 234 project beyond the outer periphery of the spindle 114. With the catch assembly 200 installed to the spindle 114, the handle 140 may be installed to the spindle 114.

During installation of the handle 140 to the spindle 114, the catches 230 are urged radially inward to their depressed positions. In certain forms, this radially-inward urging may be performed manually. Additionally or alternatively, the chamfers 235 on the tabs 234 may cause the catches 230 to be urged inward as the spindle 114 enters the chamber 144. The inner periphery of the chamber 144 then retains the catches 230 in their depressed positions until each catch 230 aligns with a corresponding recess 146 in the handle 140, at which point the biasing of the bias mechanism 220 urges the catches 230 radially outward to their projected positions such that the tabs 234 enter the recesses 146.

With the handle 140 installed to the spindle 114, the catch assembly 200 retains axial engagement between the spindle 114 and the handle 140 to thereby selectively prevent removal of the handle 140 from the spindle 114. In the event that a user wishes to remove the handle 140 from the spindle 114, the user may depress the catches 230, for example by manually engaging one catch 230 (the left catch 230 in the illustration of FIG. 3) while inserting a tool through an aperture 147 in the shank 142 to thereby depress the other catch 230 (the right catch 230 in the illustration of FIG. 3).

If the user attempts to remove the handle 140 when the outside handleset 110 is in its locked condition, the lock cylinder 150 may prevent such removal. More particularly, when the lock cylinder 150 is in its locked state, the tailpiece 156 and/or a component engaged with the tailpiece 156 (e.g., the driver 119 illustrated in FIGS. 13 and 14) may be oriented such that the wider dimension of the tailpiece 156 (or other component) is aligned with the posts 238 to thereby prevent depression of the catches 230. When the lock cylinder 150 is transitioned to its unlocked state (e.g., by inserting the proper key and rotating the plug 154), the narrower dimension of the tailpiece 156 (or other component) is aligned with the posts 238 such that the catches 230 may be depressed. In such forms, the handle 140 may be prevented from being removed while the handleset 110 is in its locked state.

Figure 4:
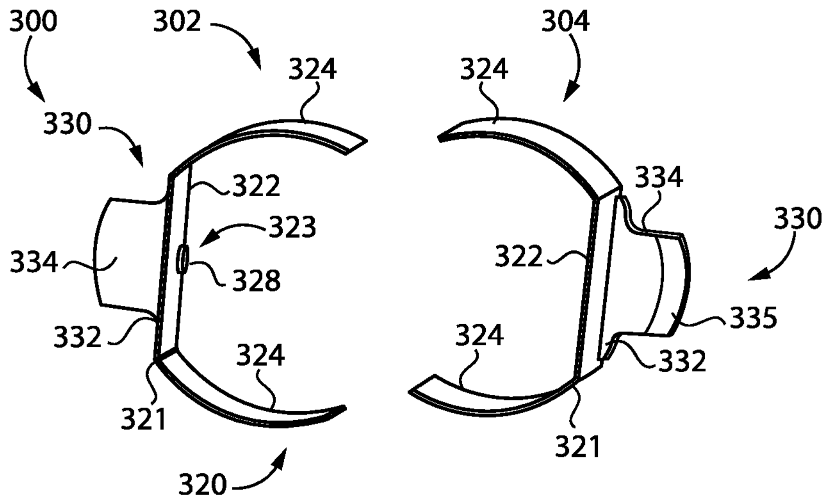
FIG. 4 is an exploded assembly view of a catch assembly according to certain embodiments.

With reference to FIG. 4, illustrated therein is a catch assembly 300 according to certain embodiments. The catch assembly 300 may, for example, be utilized as the catch assembly 116 of the outside handleset 110 and/or the catch assembly 126 of the inside handleset 120. Thus, while certain descriptions of the catch assembly 300 will be made with reference to the outside handleset 110, it should be appreciated that at least some such descriptions may be equally applicable to embodiments in which the catch assembly 300 is installed to the inside handleset 120. The catch assembly 300 generally includes a bias mechanism 320 and a pair of catches 330 biased by the bias mechanism 320 toward projected positions. The catch assembly 300 generally includes a first catch mechanism 302 and a second catch mechanism 304 substantially similar to the first catch mechanism 302. Each catch mechanism 302, 304 generally includes a leaf spring 321 and a catch 330 mounted to the leaf spring 321.

In the illustrated form, the bias mechanism 320 comprises a pair of leaf springs 321. Each leaf spring 321 includes a flat central portion 322 including an opening 323, and a pair of arcuate end portions 324 extending from opposite sides of the central portion 322.

Each catch 330 generally includes a body portion 332, a tab 334 extending radially outward from the body portion 332, and a post 338 extending radially inward from the body portion 332. The tab 334 may include a chamfer 335 analogous to the above-described chamfer 235. The post 338 extends through the opening 323, and may be deformed to thereby stake the catch 330 to the leaf spring 321.

Figure 5:
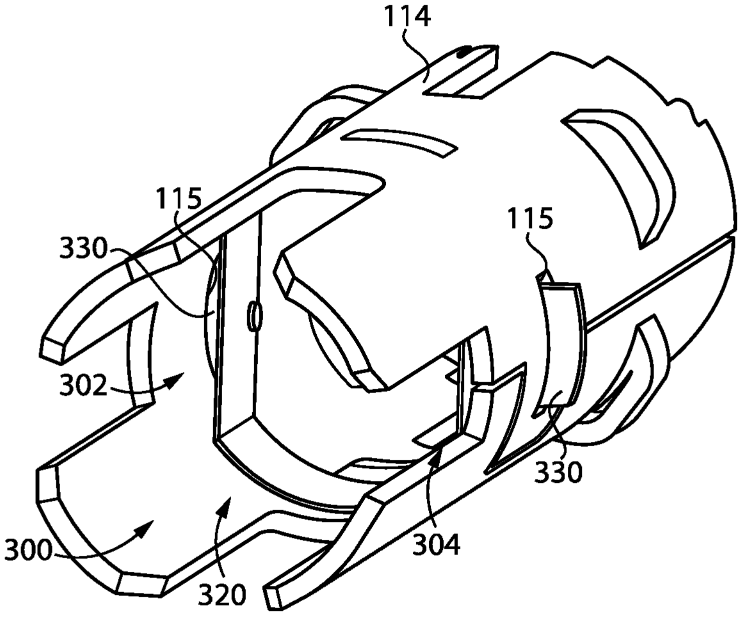
FIG. 5 is a perspective view of the catch assembly of FIG. 4 installed to a spindle.

With additional reference to FIG. 5, illustrated therein is the catch assembly 300 installed to the spindle 114. During installation of the catch assembly 300, the leaf spring 321 of the first catch mechanism 302 is first deformed to a state conducive for insertion into the spindle 114. The catch mechanism 302 is then inserted into the spindle 114 until the catch 330 aligns with a corresponding opening 115 in the spindle 114, at which point the leaf spring 321 urges the catch 330 toward its projected position such that the tab 334 projects through the opening 315. These steps may then be repeated for the second catch mechanism 304. The handle 140 may then be installed to the spindle 114 in a manner analogous to that described above such that the catch assembly 300 selectively couples the spindle 114 with the handle 140. If a user attempts to remove the handle 140 when the outside handleset 110 is in its locked condition, the lock cylinder 150 and/or driver 119 may prevent such removal in a manner analogous to that described herein.

Figure 15:
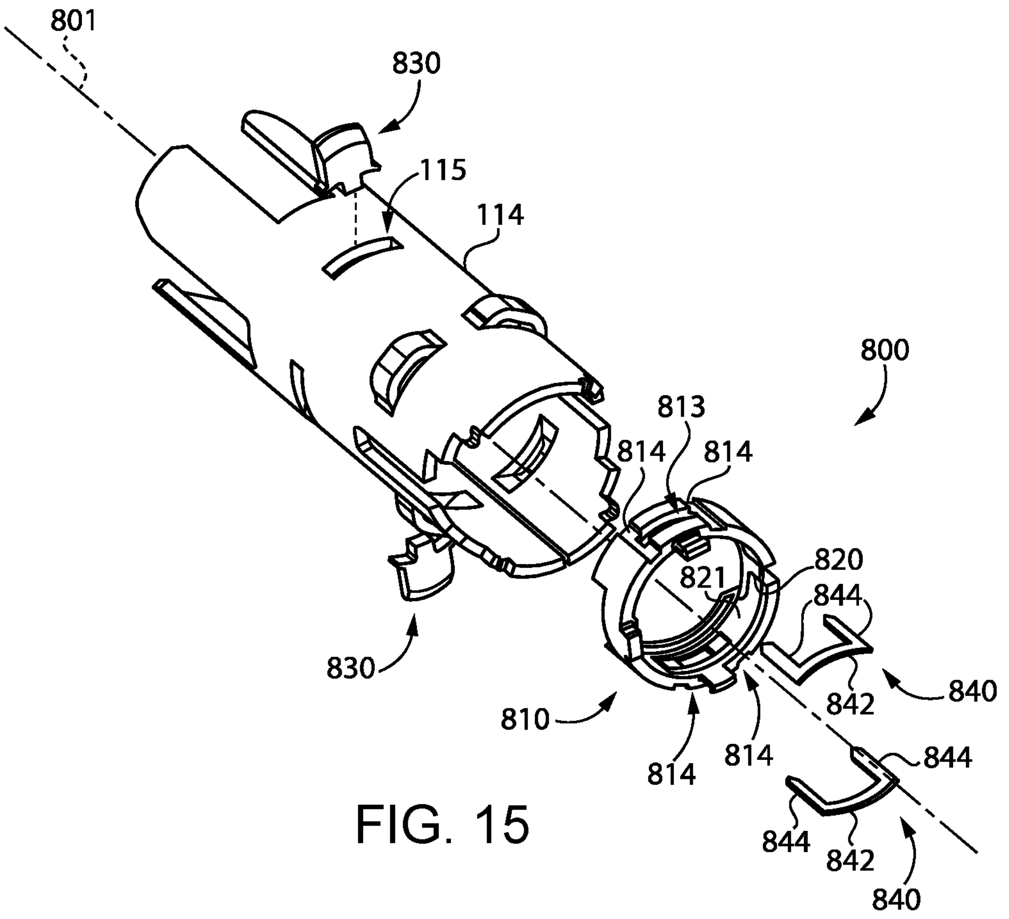
FIG. 15 is an exploded assembly view of a spindle and a catch assembly according to certain embodiments.
Figure 16:
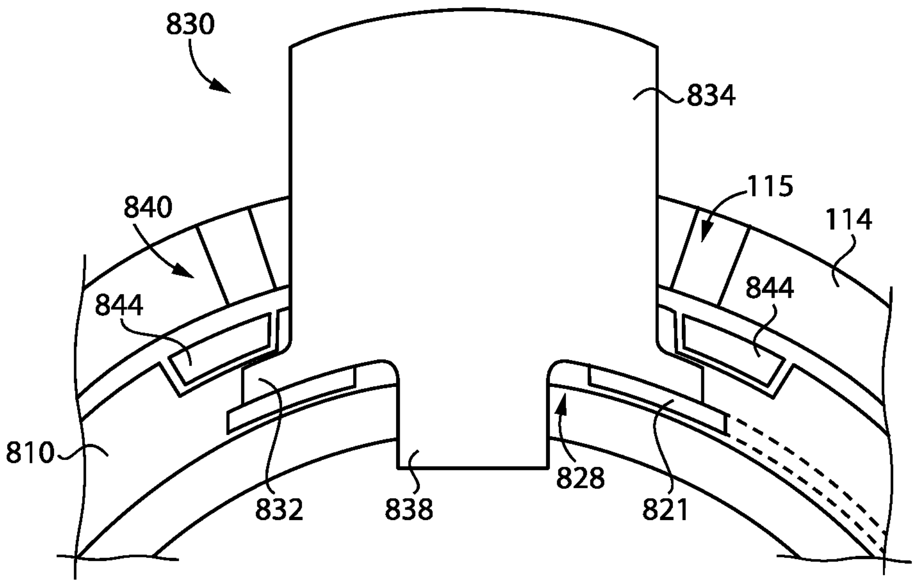
FIG. 16 is a cutaway view of a spindle with the catch assembly of FIG. 15 installed.
Figure 17:
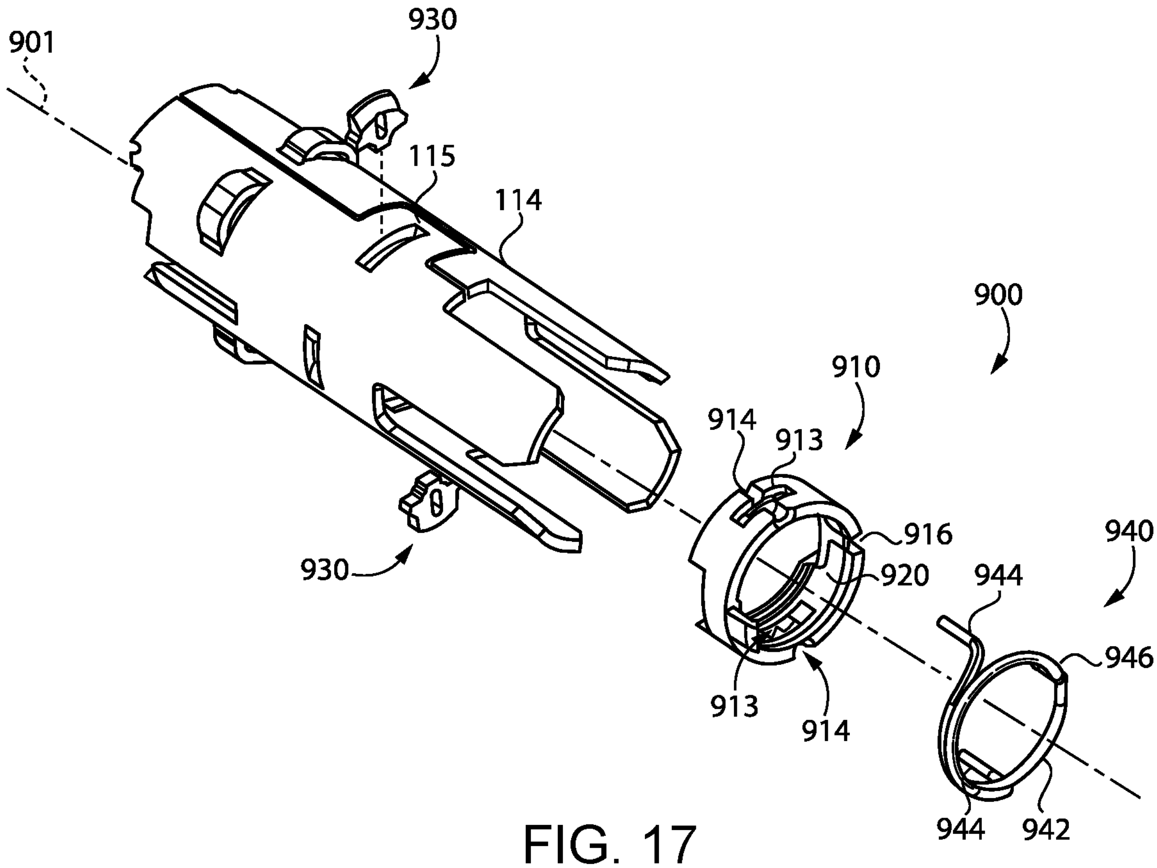
FIG. 17 is an exploded assembly view of a spindle and a catch assembly according to certain embodiments.
Figure 18:
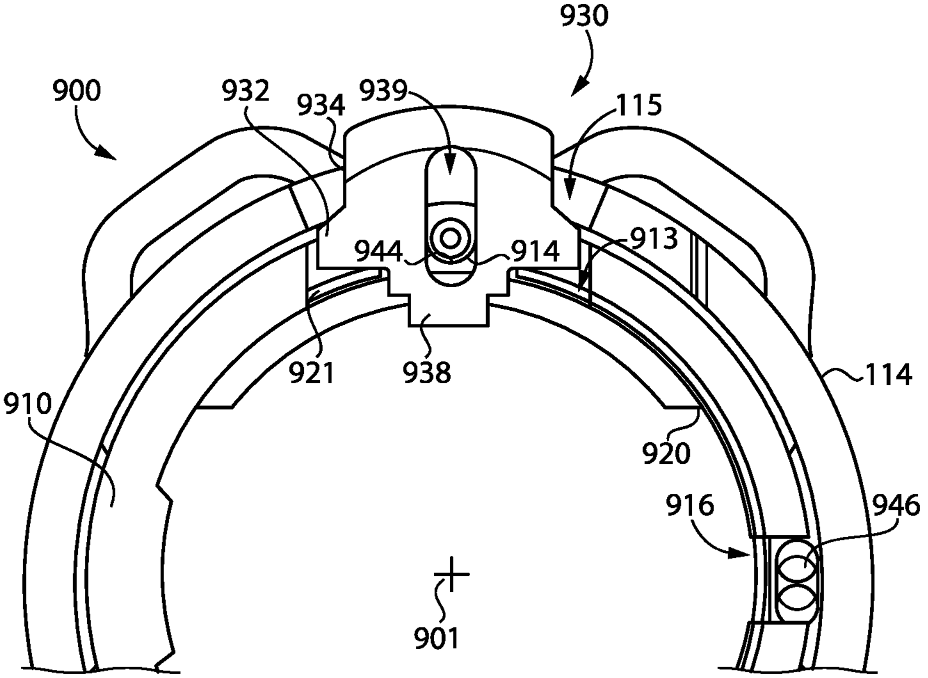
FIG. 18 is a cutaway view of a spindle with the catch assembly of FIG. 17 installed.

While not specifically illustrated in FIGS. 4 and 5, it should be appreciated that the catch assembly 300 may further include a retention mechanism configured to discourage removal of the catches 330 via the openings 115, such as the retainers 840 illustrated in FIGS. 15 and 16 or the retainer 940 illustrated in FIGS. 17 and 18.

Figure 6:
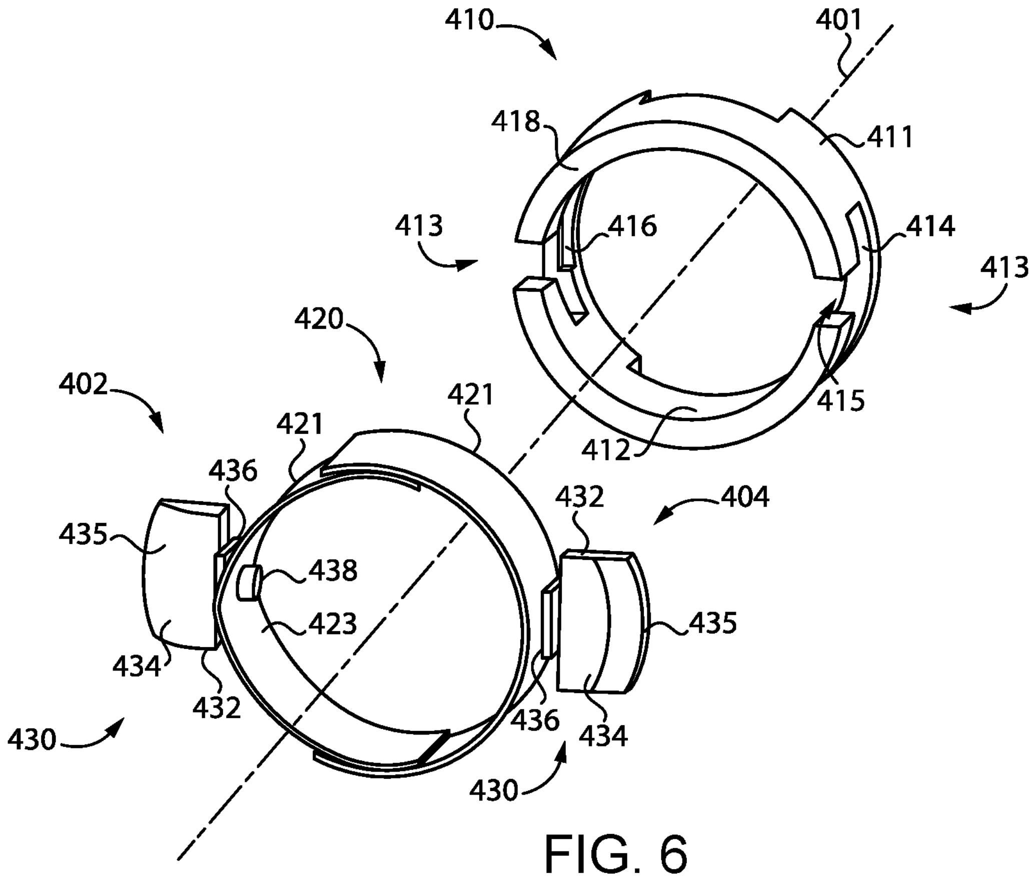
FIG. 6 is an exploded assembly view of a catch assembly according to certain embodiments.

With additional reference to FIG. 6, illustrated therein is a catch assembly 400 according to certain embodiments. The catch assembly 400 may, for example, be utilized as the catch assembly 116 of the outside handleset 110 and/or the catch assembly 126 of the inside handleset 120. Thus, while certain descriptions of the catch assembly 400 will be made with reference to the outside handleset 110, it should be appreciated that at least some such descriptions may be equally applicable to embodiments in which the catch assembly 400 is installed to the inside handleset 120. The catch assembly 400 generally includes a bias mechanism 420 and a pair of catches 340 biased by the bias mechanism 320 toward projected positions. The catch assembly 400 extends along a longitudinal axis 401, and generally includes a holder 410, a first catch mechanism 402, and a second catch mechanism 404. As described herein, each catch mechanism 402, 404 includes a leaf spring 421 and a catch 430.

The holder 410 is generally annular about the longitudinal axis 401, and includes an outer periphery 411, an inner periphery 412, and a pair of openings 413. Each opening 413 includes a circumferential portion 414 and a longitudinal slot 415, and a channel 416 is formed on the inner periphery 412 and connected with the opening 413. Each circumferential portion 414 extends about a portion of the circumference of the holder 410, and each longitudinal slot 415 extends from a first end face 418 of the holder 410 to the corresponding circumferential portion 414.

In the illustrated form, the bias mechanism 420 includes a pair of leaf springs 421. Each leaf spring 421 is generally arcuate about the longitudinal axis 401, and includes an opening 423. While other locations are contemplated, in the illustrated form, each opening 423 is formed at or near a midpoint of the leaf spring 421.

Each catch 430 is substantially similar to the above-described catches 230, and similar reference characters are used to denote similar elements and features. For example, each catch 430 generally includes a body portion 432, a tab 434, a plate 436, and a post 438, which respectively correspond to the above-described body portion 232, tab 234, plate 236, and post 238. At least a portion of the plate 436 is sized and shaped to be received in the channel 416 to thereby limit circumferential movement of the catch 430. One or both of the tabs 434 may define a chamfer 435 analogous to the above-described chamfer 235.

During assembly of the catch assembly 400, the catch mechanisms 402, 404 may first be assembled by mounting each catch 430 to the corresponding leaf spring 421. For example, the post 438 may be inserted into the opening 423, and thereafter deformed to stake the catch 430 to the leaf spring 421. The catch mechanisms 402, 404 may then be inserted into the holder 410 such that the plates 436 pass through the longitudinal slots 415 and enter the channels 416.

Figure 7:
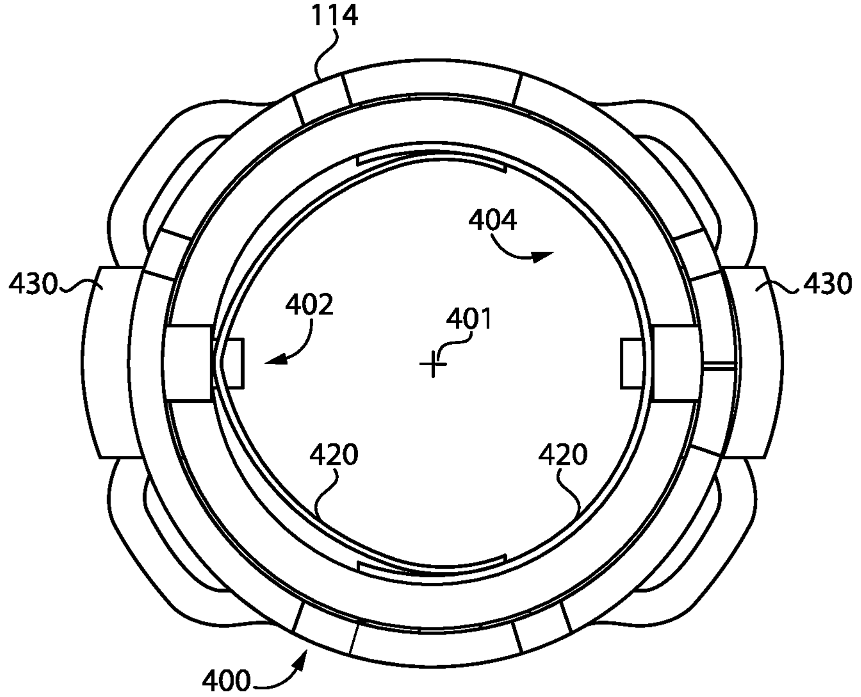
FIG. 7 is a plan view of the catch assembly of FIG. 6 installed to a spindle.

With additional reference to FIG. 7, illustrated therein is the catch assembly 400 installed to the spindle 114. Such installation may proceed in a manner analogous to that described above with respect to installation of the catch assembly 200 to the spindle 114. The catch assembly 400 may then be used to selectively couple the handle 140 to the spindle 114 in a manner analogous to that described above with reference to FIG. 3. If a user attempts to remove the handle 140 when the outside handleset 110 is in its locked condition, the lock cylinder 150 and/or driver 119 may prevent such removal in a manner analogous to that described herein.

While not specifically illustrated in FIGS. 6 and 7, it should be appreciated that the catch assembly 400 may further include a retention mechanism configured to discourage removal of the catches 430 via the openings 115, such as the retainers 840 illustrated in FIGS. 15 and 16 or the retainer 940 illustrated in FIGS. 17 and 18.

Figure 8:
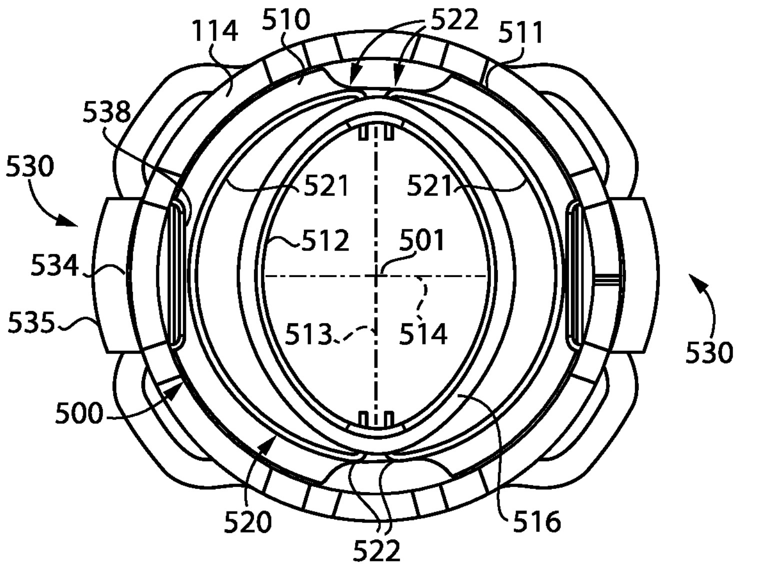
FIG. 8 is a plan view of a catch assembly according to certain embodiments in a biasing state.
Figure 9:
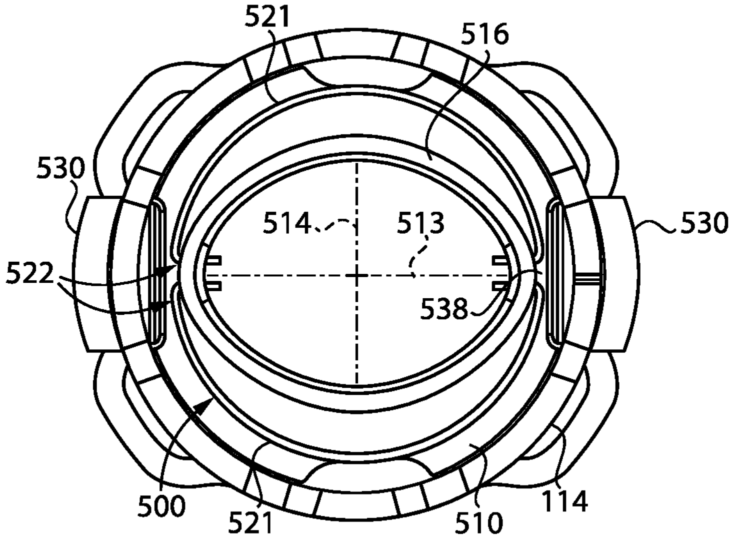
FIG. 9 is a plan view of the catch assembly of FIG. 8 in a retaining state.

With reference to FIGS. 8 and 9, illustrated therein is a catch assembly 500 according to certain embodiments. The catch assembly 500 may, for example, be utilized as the catch assembly 116 of the outside handleset 110 and/or the catch assembly 126 of the inside handleset 120. Thus, while certain descriptions of the catch assembly 500 will be made with reference to the outside handleset 110, it should be appreciated that at least some such descriptions may be equally applicable to embodiments in which the catch assembly 500 is installed to the inside handleset 120. As described herein, the catch assembly 500 generally includes a holder 510, a bias mechanism 520, and a pair of catches 530.

The holder 510 has an outer periphery 511 and an inner periphery 512, the latter of which is defined at least in part by an oblong collar 516 having a major dimension 513 and a minor dimension 514. As described herein, the inner periphery 512 of the holder 510 is sized and shaped to engage the tailpiece 156 or another component engaged with the plug 154 (e.g., the driver 119 illustrated in FIGS. 13 and 14) such that the holder 510 rotates as the lock cylinder 150 transitions the outside handleset 110 between its locked and unlocked conditions.

In the illustrated form, the bias mechanism 520 includes a pair of leaf springs 521. Each leaf spring 521 is generally arcuate about the longitudinal axis 501, and has a pair of opposite end portions 522. Each end portion 522 is anchored to the holder 510 at a location near the major dimension 513 of the inner periphery 512.

Each catch 530 is operable to engage a corresponding leaf spring 521, and generally includes a tab 534 that may include a chamfer 535, and a radially-inner abutment portion 538.

During installation of the catch assembly 500 to the spindle 114, each catch 530 may be inserted into a respective spindle opening 115, and the holder 510 with the leaf springs 521 mounted thereon may be inserted into the spindle 114 until the leaf springs 521 are longitudinally aligned with the catches 530. When so installed to the spindle 114, the collar 516 is operable to engage the tailpiece 156 and/or another component engaged with the plug 154, such as the driver 119 illustrated in FIGS. 13 and 14. With the collar 516 engaged with the tailpiece 156 and/or other component, the collar 516 is operably engaged with the plug 154 such that the minor dimension 514 is aligned with the abutment portions 538 when the outside handleset 110 is in its unlocked condition (FIG. 8), and such that the major dimension 513 is aligned with the abutment portions 538 when the outside handleset 110 is in its locked condition (FIG. 9).

When the outside handleset 110 is in its unlocked condition (FIG. 8), the minor dimension 514 of the collar 516 is aligned with the catches 530, and the leaf springs 521 are engaged with the abutment portions 538. As a result, the leaf springs 521 bias the catches 530 radially outward to the projected positions thereof, but also permit the catches 530 to be urged radially inward to their depressed positions. Accordingly, when the outside handleset 110 is in its unlocked condition, the catch assembly 500 permits radially-inward movement of the catches 530 such that the handle 140 is operable to be decoupled and removed from the spindle 114.

When the outside handleset 110 is in its locked condition (FIG. 9), the major dimension 513 of the collar 516 is aligned with the catches 530, and the anchored end portions 522 of the leaf springs 521 are engaged with the abutment portions 538. As a result, the collar 516 retains the catches 530 in their projected positions. Accordingly, when the outside handleset 110 is in its locked condition, the catch assembly 500 prevents radially-inward movement of the catches 530 such that the handle 140 is inoperable to be decoupled and removed from the spindle 114.

While not specifically illustrated in FIGS. 8 and 9, it should be appreciated that the catch assembly 500 may further include a retention mechanism configured to discourage removal of the catches 530 via the openings 115, such as the retainers 840 illustrated in FIGS. 15 and 16 or the retainer 940 illustrated in FIGS. 17 and 18.

Figure 10:
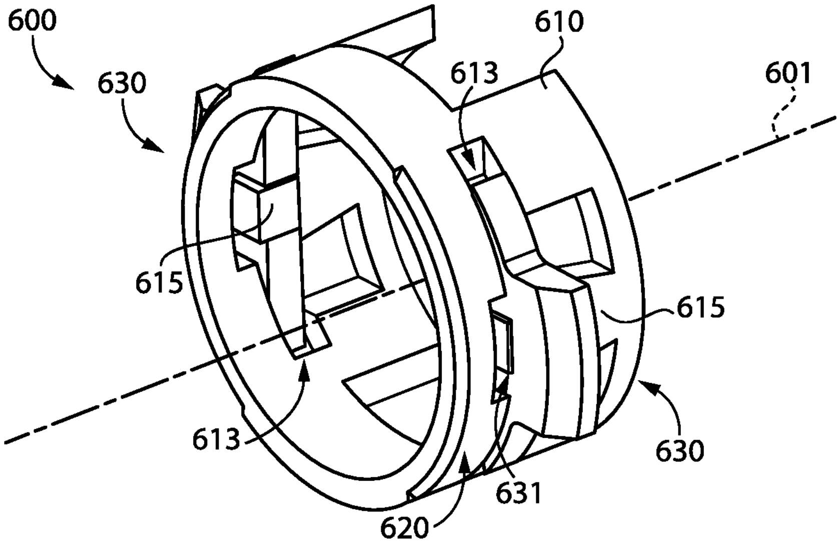
FIG. 10 is a perspective view of a catch assembly according to certain embodiments.
Figure 11:
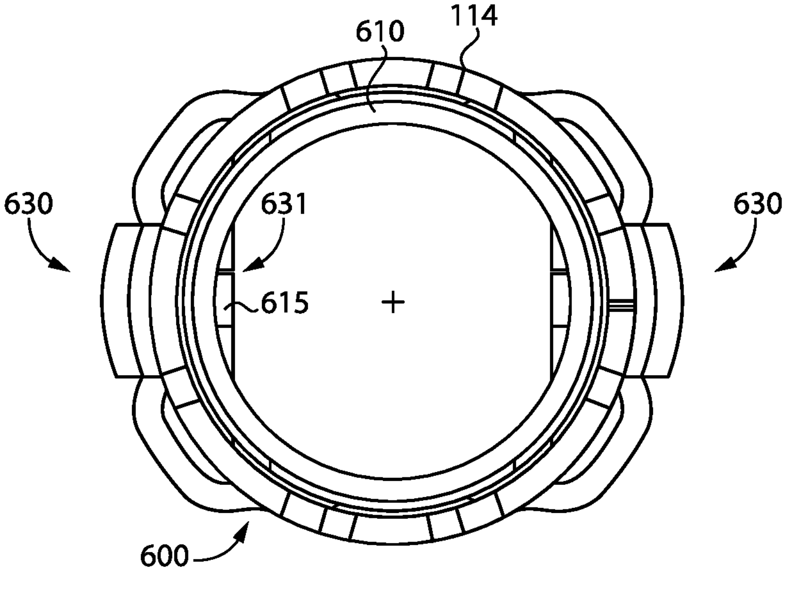
FIG. 11 is a plan view of the catch assembly of FIG. 10 installed to a spindle.

With reference to FIGS. 10 and 11, illustrated therein is a catch assembly 600 according to certain embodiments. The catch assembly 600 may, for example, be utilized as the catch assembly 116 of the outside handleset 110 and/or the catch assembly 126 of the inside handleset 120. Thus, while certain descriptions of the catch assembly 600 will be made with reference to the outside handleset 110, it should be appreciated that at least some such descriptions may be equally applicable to embodiments in which the catch assembly 600 is installed to the inside handleset 120. As described herein, the catch assembly 600 extends along a longitudinal axis 601, and generally includes a holder 610, a bias mechanism 620, and a pair of catches 630 movably mounted to the holder 610 such that the bias mechanism 620 urges the catches 630 outward.

The holder 610 is generally annular about the longitudinal axis 601, and includes a pair of openings 613 and a pair of flexible arms 615, each of which extends into a corresponding one of the openings 613. Each arm 615 extends generally in the longitudinal direction, and is self-biased in a radially-outward direction. Thus, each arm 615 is biased toward a projected position, and is movable toward a depressed position.

In the illustrated form, the bias mechanism 620 is integrally formed with the holder 610, and includes the flexible arms 615.

Each catch 630 includes a notch 631 sized and shaped to receive a portion of a corresponding arm 615, and is mounted to a corresponding one of the flexible arms 615 such that the bias mechanism 620 biases the catches 630 toward their projected positions.

During assembly of the catch assembly 600, the catches 630 may be positioned such that each arm 615 is at least partially received in a corresponding one of the notches 631. The catches 630 may be secured to the arms 615 using a suitable attachment mechanism, such as adhesive or a fastener. Additionally or alternatively, the arms 615 may be press fit into the notches 631. With the catch assembly 600 assembled, the catch assembly 600 may be installed to the spindle 114 in a manner analogous to that described above with reference to the installation of the catch assembly 200 to the spindle 114. The catch assembly 600 may then be used to selectively couple the handle 140 to the spindle 114 in a manner analogous to that described above with reference to FIG. 3. If a user attempts to remove the handle 140 when the outside handleset 110 is in its locked condition, the lock cylinder 150 and/or driver 119 may prevent such removal in a manner analogous to that described above.

While not specifically illustrated in FIGS. 10 and 11, it should be appreciated that the catch assembly 600 may further include a retention mechanism configured to discourage removal of the catches 630 via the openings 115, such as the retainers 840 illustrated in FIGS. 15 and 16 or the retainer 940 illustrated in FIGS. 17 and 18.

Figure 12:
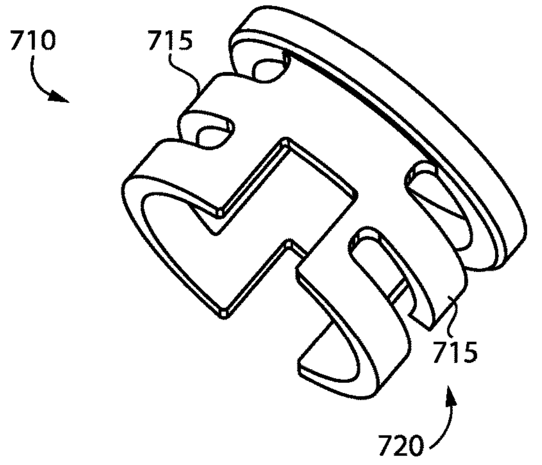
FIG. 12 is a perspective view of a portion of a catch assembly according to certain embodiments.
Figure 13:
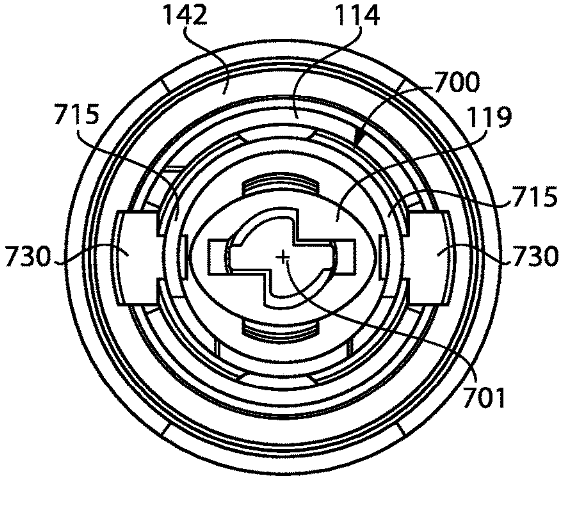
FIG. 13 is a plan view of a catch assembly according to certain embodiments in a retaining state while a lockset is in a locked state.
Figure 14:
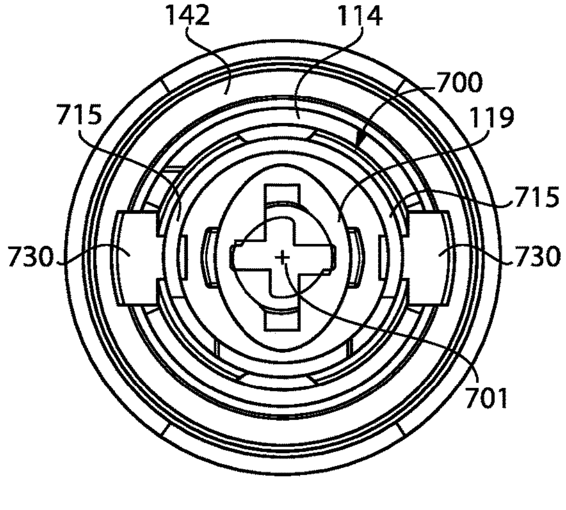
FIG. 14 is a plan view of the catch assembly of FIG. 13 in a biasing state while the lockset is in an unlocked state.

With reference to FIGS. 12-14, illustrated therein is a catch assembly 700 according to certain embodiments. The catch assembly 700 may, for example, be utilized as the catch assembly 116 of the outside handleset 110 and/or the catch assembly 126 of the inside handleset 120. Thus, while certain descriptions of the catch assembly 700 will be made with reference to the outside handleset 110, it should be appreciated that at least some such descriptions may be equally applicable to embodiments in which the catch assembly 700 is installed to the inside handleset 120. As described herein, the catch assembly 700 extends along a longitudinal axis 701, and generally includes a holder 710, a bias mechanism 720, and a pair of catches 730 movably mounted to the holder 710 such that the bias mechanism 720 urges the catches 730 outward.

The holder 710 is somewhat similar to the above-described holder 610, and includes a pair of flexible arms 715, each of which is self-biased in the radially-outward direction. In contrast to the longitudinally-extending arms 615, the arms 715 of the illustrated holder 710 are generally arcuate, and extend in the circumferential direction.

In the illustrated form, the bias mechanism 720 is integrally formed with the holder 710, and includes the flexible arms 715.

Each catch 730 is mounted to a corresponding one of the flexible arms 715 such that the bias mechanism 720 biases the catches 730 toward their projected positions.

FIGS. 13 and 14 illustrate the catch assembly 700 installed to the outside handleset 110 and providing a selective coupling between the spindle 114 and the handle 140. Also illustrated in FIGS. 13 and 14 is a driver 119 operable to transition the outside handleset 110 between its locked condition and its unlocked condition. The driver 119 is engaged with the tailpiece 156 such that the driver 119 is operable to be actuated by the lock cylinder 150 for unlocking of the outside handleset 110.

With the handleset 110 in its locked condition (FIG. 13), a major dimension of the driver 119 is aligned with the catches 730, thereby preventing depression of the catches 730. As a result, the catch assembly 700 cannot be transitioned to its decoupling state, and the handle 140 is retained on the spindle 114. When the handleset is in its unlocked condition (FIG. 14), a minor dimension of the driver 119 is aligned with the catches 730, thereby permitting depression of the catches 730. As a result, the catch assembly 700 can be transitioned to its decoupling state, and the handle 140 is operable to be removed from the spindle 114.

While not specifically illustrated in FIGS. 12-14, it should be appreciated that the catch assembly 700 may further include a retention mechanism configured to discourage removal of the catches 730 via the openings 115, such as the retainers 840 illustrated in FIGS. 15 and 16 or the retainer 940 illustrated in FIGS. 17 and 18.

With reference to FIGS. 15 and 16, illustrated therein is a catch assembly 800 according to certain embodiments. The catch assembly 800 may, for example, be utilized as the catch assembly 116 of the outside handleset 110 and/or the catch assembly 126 of the inside handleset 120. Thus, while certain descriptions of the catch assembly 800 will be made with reference to the outside handleset 110, it should be appreciated that at least some such descriptions may be equally applicable to embodiments in which the catch assembly 800 is installed to the inside handleset 120. As described herein, the catch assembly 800 extends along a longitudinal axis 801, and generally includes a holder 810, a bias mechanism 820, a pair of catches 830 movably mounted to the holder 810, and a pair of retainers 840 preventing removal of the catches 830.

The holder 810 is generally annular about the longitudinal axis 801, and includes a pair of openings 813, each of which is sized and shaped to receive a corresponding one of the catches 830. Defined on the outer periphery of the holder 810 are two pairs of longitudinal grooves 814, with each pair of grooves 814 positioned on opposite sides of a corresponding one of the openings 813 such that each opening 813 intersects a corresponding pair of grooves 814.

The bias mechanism 820 is mounted within the holder 810, and is configured to bias the catches 830 radially outward toward the projected positions thereof. The illustrated bias mechanism 820 is provided in the form of an arcuate leaf spring 821, which may include a pair of openings 828 configured to receive posts 838 of the catches 830.

Each catch 830 generally includes a body portion 832, a tab 834 extending radially outward from the body portion 832, and a post 838 extending radially inward from the body portion 832. The post 838 extends through an opening 828 in the leaf spring 821, and may be deformed to thereby stake the catch 830 to the leaf spring 821.

Each retainer 840 generally includes a circumferentially-extending body 842 and a pair of legs 844 extending longitudinally from the body. As described herein, the retainers 840 may be utilized to discourage removal of the catches 830 from the holder 810.

During an example procedure for assembly and installation of the catch assembly 800, the leaf spring 821 may be mounted to the holder 810, and the holder 810 and leaf spring 821 may be inserted into the spindle 114 such that the holder openings 813 align with the spindle openings 115. The catches 830 may then be inserted via the aligned openings 115, 813 such that the body portion 832 engages the leaf spring 821 and the post 838 projects through the opening 828 in the leaf spring 821. The retainers 840 may then be longitudinally inserted such that each leg 844 enters a corresponding groove 814, thereby capturing the body portion 832 of each catch 830 between the legs 844 and the leaf spring 821. As a result, the catches 830 are capable of limited travel between the projected and depressed positions thereof, but are prevented from fully exiting the spindle openings 115.

Once installed to the spindle 114, the catch assembly 800 may be used to selectively couple the handle 140 to the spindle 114 in a manner analogous to that described above with reference to FIG. 3. If a user attempts to remove the handle 140 when the outside handleset 110 is in its locked condition, the lock cylinder 150 and/or driver 119 may prevent such removal in a manner analogous to that described above.

Although the retainers 840 have been described with specific reference to the catch assembly 800 illustrated in FIGS. 15 and 16, it should be appreciated that such retainers 840 may also be utilized in combination with other embodiments. As one example, the holder 210 of the catch assembly 200 illustrated in FIGS. 2 and 3 may include two pairs of grooves corresponding to the two pairs of grooves 814, and the retainers 840 may be utilized to prevent removal of the catches 230 in a manner analogous to that described above. As another example, the holder 410 of the catch assembly 400 illustrated in FIGS. 6 and 7 may include two pairs of grooves corresponding to the grooves 814, and the retainers 840 may be utilized to prevent removal of the catches 430 in a manner analogous to that described above.

With reference to FIGS. 17 and 18, illustrated therein is a catch assembly 900 according to certain embodiments. The catch assembly 900 may, for example, be utilized as the catch assembly 116 of the outside handleset 110 and/or the catch assembly 126 of the inside handleset 120. Thus, while certain descriptions of the catch assembly 900 will be made with reference to the outside handleset 110, it should be appreciated that at least some such descriptions may be equally applicable to embodiments in which the catch assembly 900 is installed to the inside handleset 120. As described herein, the catch assembly 900 extends along a longitudinal axis 901, and generally includes a holder 910, a bias mechanism 920, a pair of catches 930 movably mounted to the holder 910, and a retainer 940 preventing removal of the catches 930.

The holder 910 is generally annular about the longitudinal axis 901, and includes a pair of openings 913, each of which is sized and shaped to receive a corresponding one of the catches 930. Defined on the outer periphery of the holder 910 are two longitudinal grooves 914, with each groove 914 intersecting a corresponding one of the openings 913. The holder 910 may further include an additional longitudinal groove 916 configured to receive a stabilization portion 946 of the retainer 940.

In the illustrated form, the bias mechanism 920 comprises a leaf spring 921. The leaf spring 921 is mounted within the holder 910, and is configured to bias the catches 930 radially outward toward the projected positions thereof. The leaf spring 921 may include a pair of openings 928 configured to receive posts 938 of the catches 930.

Each catch 930 generally includes a body portion 932, a tab 934 extending radially outward from the body portion 932, and a post 938 extending radially inward from the body portion 932. The post 938 extends through an opening 928 in the leaf spring 921, and may be deformed to thereby stake the catch 930 to the leaf spring 921. Each catch 930 also includes a slot 939 configured to receive an end portion 944 of the retainer 940.

The illustrated retainer 940 generally includes an annular portion 942 and a pair of longitudinally-extending end portions 944, and may further include a longitudinal stabilization portion 946.

During an example procedure for assembly and installation of the catch assembly 900, the leaf spring 921 may be mounted to the holder 910, and the holder 910 and leaf spring 921 may be inserted into the spindle 114 such that the holder openings 913 align with the spindle openings 115. The catches 930 may then be inserted via the aligned openings 115, 913 such that the body portion 932 engages the leaf spring 921 and the post 938 projects through the opening 928 in the leaf spring 921. The retainer 940 may then be longitudinally inserted such that each end portion 944 enters a corresponding slot 939, while the stabilization portion 946 enters the groove 916. When the catch assembly 900 is installed to the spindle 114, the end portions 944 and the slots 939 permit limited travel of the catches 930 between the projected and depressed positions thereof, but prevent the catches 930 from fully exiting the spindle openings 115.

Once installed to the spindle 114, the catch assembly 900 may be used to selectively couple the handle 140 to the spindle 114 in a manner analogous to that described above with reference to FIG. 3. If a user attempts to remove the handle 140 when the outside handleset 110 is in its locked condition, the lock cylinder 150 and/or driver 119 may prevent such removal in a manner analogous to that described above.

Although the retainer 940 has been described with specific reference to the catch assembly 900 illustrated in FIGS. 17 and 18, it should be appreciated that such a retainer 940 may also be utilized in combination with other embodiments. As one example, the holder 210 of the catch assembly 200 illustrated in FIGS. 2 and 3 may include a pair of groove corresponding to the grooves 914, and the end portions 944 of the retainer 940 may extend through slots in the catches 230 to prevent removal of the catches 230 in a manner analogous to that described above. As another example, the holder 410 of the catch assembly 400 illustrated in FIGS. 6 and 7 may include a pair of grooves corresponding to the grooves 914, and the end portions 944 of the retainer 940 may extend through slots in the catches 430 to prevent removal of the catches 430 in a manner analogous to that described above.

Figure 19:
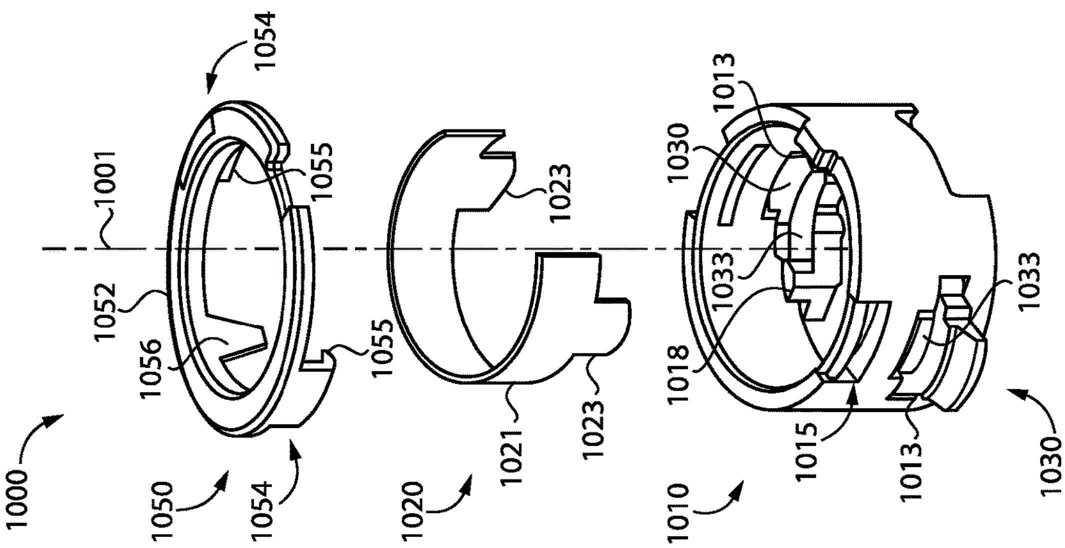
FIG. 19 is a partially-exploded assembly view of a catch assembly according to certain embodiments.

With reference to FIG. 19, illustrated therein is a catch assembly 1000 according to certain embodiments. The catch assembly 1000 may, for example, be utilized as the catch assembly 116 of the outside handleset 110 and/or the catch assembly 126 of the inside handleset 120. Thus, while certain descriptions of the catch assembly 1000 will be made with reference to the outside handleset 110, it should be appreciated that at least some such descriptions may be equally applicable to embodiments in which the catch assembly 1000 is installed to the inside handleset 120. As described herein, the catch assembly 1000 extends along a longitudinal axis 1001, and generally includes a holder 1010, a bias mechanism 1020, a pair of catches 1030 movably mounted to the holder 1010 such that the bias mechanism 1020 urges the catches 1030 outward, and a cap 1050 that retains the bias mechanism 1020 within the holder 1010.

The holder 1010 includes a pair of openings 1013 in which the catches 1030 are movably seated. The holder 1010 also includes one or more recesses 1015 that provide mounting locations or anchor points for the cap 1050.

In the illustrated form, the bias mechanism 1020 is provided in the form of an arcuate leaf spring 1021, each end of which is engaged with a corresponding one of the catches 1030. For example, each end of the leaf spring 1021 may include a longitudinal extension 1023 that is received in a slot 1033 of the corresponding catch 1030.

The catches 1030 are movably mounted in the openings 1013, and are engaged with the leaf spring 1021 such that the bias mechanism 1020 urges the catches 1030 outward toward the projected positions thereof. For example, each catch 1030 may include a slot 1033 that receives a corresponding extension 1023 of the leaf spring 1021.

The cap 1050 includes a body portion 1052 that is generally annular about the longitudinal axis 1001, and a pair of clip arms 1054 that depend from the body portion 1052. Each clip arm 1054 includes a tab 1055 that is angled inward and received in a corresponding recess 1015 to secure the cap 1050 to the holder 1010. The cap 1050 may further include a projection 1056 that projects from the body portion 1052 and prevents radially-inward movement of the leaf spring 1021.

During assembly of the catch assembly 1000, the catches 1030 may be inserted into the holder openings 1013 from outside the holder 1010. The leaf spring 1021 may then be compressed and inserted into the holder 1010 such that the end portions thereof engage the catches 1030. The cap 1050 may then be pressed onto the end of the holder 1010 such that the tabs 1055 snap into the recesses 1015 to constrain longitudinal movement of the bias mechanism 1020 in a first longitudinal direction. Movement of the bias mechanism 1020 in the opposite longitudinal direction may be constrained by the catches 1030 and/or a ridge 1018 of the holder 1010.

When assembled, the catch assembly 1000 may be installed to the spindle 114 as a modular unit in a manner analogous to that described above. While not specifically illustrated in FIG. 19, it should be appreciated that the catch assembly 1000 may utilize a retention mechanism if needed, such as the retention mechanism 840 illustrated in FIGS. 15 and 16 or the retention mechanism 940 illustrated in FIGS. 17 and 18. It is also contemplated that such retention mechanisms may not necessarily be required in the embodiment illustrated in FIG. 19.

Figure 20:
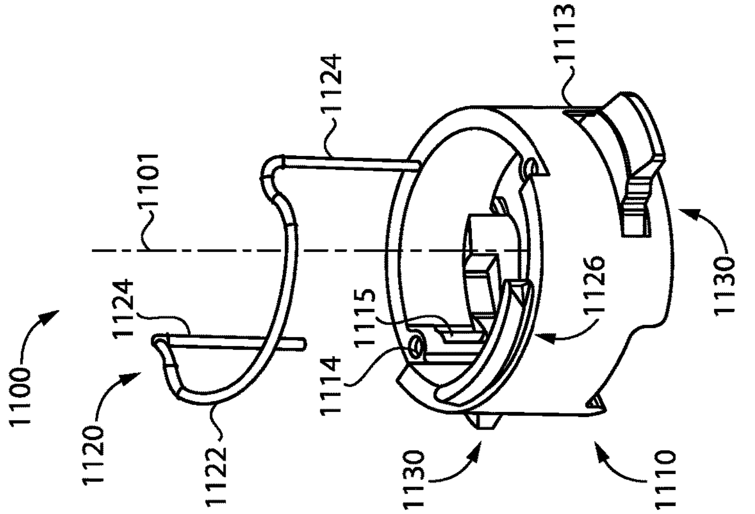
FIG. 20 is a partially-exploded assembly view of a catch assembly according to certain embodiments.

With reference to FIG. 20, illustrated therein is a catch assembly 1100 according to certain embodiments. The catch assembly 1100 may, for example, be utilized as the catch assembly 116 of the outside handleset 110 and/or the catch assembly 126 of the inside handleset 120. Thus, while certain descriptions of the catch assembly 1100 will be made with reference to the outside handleset 110, it should be appreciated that at least some such descriptions may be equally applicable to embodiments in which the catch assembly 1100 is installed to the inside handleset 120. As described herein, the catch assembly 1100 extends along a longitudinal axis 1101, and generally includes a holder 1110, a bias mechanism 1120, and a pair of catches 1130 movably mounted to the holder 1110 such that the bias mechanism 1120 urges the catches 1130 outward.

The holder 1110 includes a pair of radial openings 1113 in which the catches 1130 are movably seated. The holder 1110 also includes a pair of longitudinal openings 1114 for receiving corresponding legs 1124 of the bias mechanism 1120. The longitudinal openings 1114 intersect longitudinal slots 1115 that allow the legs 1124 to flex radially inward. The holder 1110 also includes a circumferentially-extending channel 1112 that receives a body portion 1122 of the bias mechanism 1120.

In the illustrated form, the bias mechanism 1120 is provided in the form of a wire spring 1121, and generally includes a body portion 1122 and a pair of legs 1124 extending from opposite sides of the body portion 1122. The body portion 1122 is received in the circumferential channel 1112 of the holder 1110, which constrains longitudinal movement of the bias mechanism 1120. Each leg 1124 extends through a corresponding one of the longitudinal openings 1115 and into engagement with a corresponding one of the catches 1130. When the catches 530 are depressed, the legs 1124 flex radially inward through the slots 1115.

When assembled, the catch assembly 1100 may be installed to the spindle 114 as a modular unit in a manner analogous to that described above. While not specifically illustrated in FIG. 20, it should be appreciated that the catch assembly 1100 may utilize a retention mechanism if needed, such as the retention mechanism 840 illustrated in FIGS. 15 and 16 or the retention mechanism 940 illustrated in FIGS. 17 and 18. It is also contemplated that such retention mechanisms may not necessarily be required in the embodiment illustrated in FIG. 20.

Figure 21:
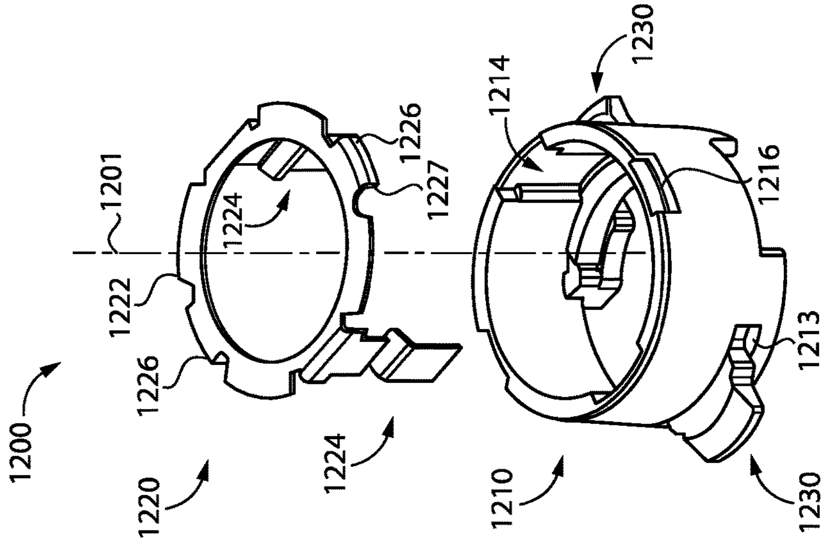
FIG. 21 is a partially-exploded assembly view of a catch assembly according to certain embodiments.

With reference to FIG. 21, illustrated therein is a catch assembly 1200 according to certain embodiments. The catch assembly 1200 may, for example, be utilized as the catch assembly 116 of the outside handleset 110 and/or the catch assembly 126 of the inside handleset 120. Thus, while certain descriptions of the catch assembly 1200 will be made with reference to the outside handleset 110, it should be appreciated that at least some such descriptions may be equally applicable to embodiments in which the catch assembly 1200 is installed to the inside handleset 120. As described herein, the catch assembly 1200 extends along a longitudinal axis 1201, and generally includes a holder 1210, a bias mechanism 1220, and a pair of catches 1230 movably mounted to the holder 1210 such that the bias mechanism 1220 urges the catches 1230 outward.

The holder 1210 includes a pair of radial openings 1213 in which the catches 1230 are movably seated. The holder 1210 also includes a pair of longitudinal channels 1214 for receiving corresponding legs 1224 of the bias mechanism 1220. The holder 1210 also includes a pair of recesses 1216 operable to engage clip arms 1226 of the bias mechanism 1220.

In the illustrated form, the bias mechanism 1220 includes an annular body portion 1222, from which project a pair of legs 1224 and a pair of clip arms 1226. Each leg 1224 is seated in a corresponding channel 1214, and serves as a leaf spring for a corresponding one of the catches 1230 such that the catches 1230 are biased outward by the bias mechanism 1220. Each clip arm 1226 includes a tab 1227 that is angled inward and received in a corresponding recess 1016 to secure the bias mechanism 1220 to the holder 1210.

When assembled, the catch assembly 1200 may be installed to the spindle 114 as a modular unit in a manner analogous to that described above. While not specifically illustrated in FIG. 21, it should be appreciated that the catch assembly 1200 may utilize a retention mechanism if needed, such as the retention mechanism 840 illustrated in FIGS. 15 and 16 or the retention mechanism 940 illustrated in FIGS. 17 and 18. It is also contemplated that such retention mechanisms may not necessarily be required in the embodiment illustrated in FIG. 21.

Figure 22:
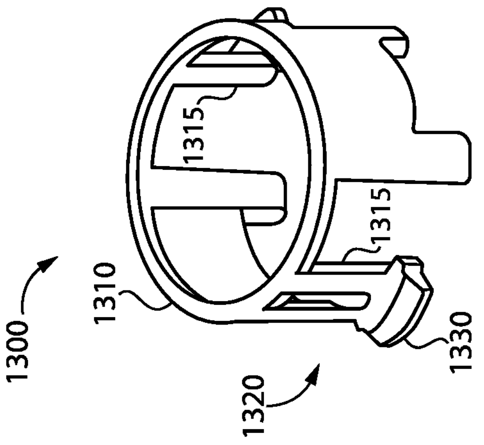
FIG. 22 is a perspective view of a catch assembly according to certain embodiments.

With reference to FIG. 22, illustrated therein is a catch assembly 1300 according to certain embodiments. The catch assembly 1300 may, for example, be utilized as the catch assembly 116 of the outside handleset 110 and/or the catch assembly 126 of the inside handleset 120. Thus, while certain descriptions of the catch assembly 1300 will be made with reference to the outside handleset 110, it should be appreciated that at least some such descriptions may be equally applicable to embodiments in which the catch assembly 1300 is installed to the inside handleset 120. In the interest of conciseness, the following descriptions of the catch assembly 1400 focus primarily on features different from those described above with reference to the above-described catch assemblies.

The catch assembly 1300 generally includes a holder 1310, a bias mechanism 1320, and a pair of catches 1330 mounted to the holder 1310 such that the bias mechanism 1320 urges the catches 1330 outward. The illustrated holder 1310 is generally annular, and includes a pair of longitudinally-extending flexible arms 1315, which define the bias mechanism 1320. Each catch 1330 is formed on the free end of a corresponding one of the arms 1315 such that the bias mechanism 1320 biases the catches 1330 outward to the projected positions thereof. In the illustrated form, the catch assembly 1300 is provided as an integrally formed, unitary construction in which the collar 1310, the bias mechanism 1320, and the catches 1330 are provided as a monolithic structure. The catch assembly 1300 may be installed to the spindle 114 as a modular unit in a manner analogous to that described above.

Figure 23:
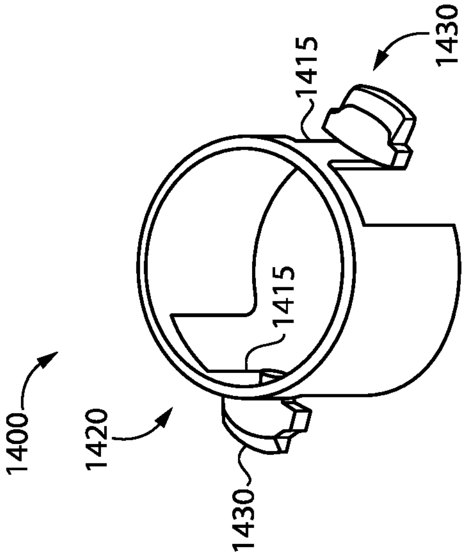
FIG. 23 is a perspective view of a catch assembly according to certain embodiments.

With reference to FIG. 23, illustrated therein is a catch assembly 1400 according to certain embodiments. The catch assembly 1400 may, for example, be utilized as the catch assembly 116 of the outside handleset 110 and/or the catch assembly 126 of the inside handleset 120. Thus, while certain descriptions of the catch assembly 1400 will be made with reference to the outside handleset 110, it should be appreciated that at least some such descriptions may be equally applicable to embodiments in which the catch assembly 1400 is installed to the inside handleset 120. In the interest of conciseness, the following descriptions of the catch assembly 1400 focus primarily on features different from those described above with reference to the above-described catch assemblies.

The catch assembly 1400 generally includes a holder 1410, a bias mechanism 1420, and a pair of catches 1430 mounted to the holder 1410 such that the bias mechanism 1420 urges the catches 1430 outward. The holder 1410 is generally annular, and includes a pair of longitudinally-extending flexible arms 1415, which define the bias mechanism 1420. Each catch 1420 is mounted on the free end of a corresponding one of the arms 1415 such that the bias mechanism 1420 biases the catches 1430 outward to the projected positions thereof. In the illustrated form, the collar 1410 and the bias mechanism 1420 are integrally formed as a monolithic structure. The catch assembly 1400 may be installed to the spindle 114 as a modular unit in a manner analogous to that described above.

Figure 24:
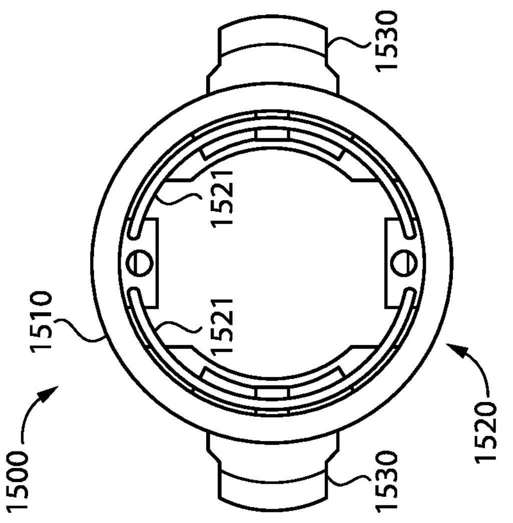
FIG. 24 is a plan view of a catch assembly according to certain embodiments.

With reference to FIG. 24, illustrated therein is a catch assembly 1500 according to certain embodiments. The catch assembly 1500 may, for example, be utilized as the catch assembly 116 of the outside handleset 110 and/or the catch assembly 126 of the inside handleset 120. Thus, while certain descriptions of the catch assembly 1500 will be made with reference to the outside handleset 110, it should be appreciated that at least some such descriptions may be equally applicable to embodiments in which the catch assembly 1500 is installed to the inside handleset 120. In the interest of conciseness, the following descriptions of the catch assembly 1500 focus primarily on features different from those described above with reference to the above-described catch assemblies.

The catch assembly 1500 generally includes a holder 1510, a bias mechanism 1520, and a pair of catches 1530 mounted to the holder 1510 such that the bias mechanism 1520 urges the catches 1530 outward. The holder 1510 is generally annular, and the bias mechanism 1520 is mounted to the holder 1510. In the illustrated form, the bias mechanism 1520 is provided in the form of one or more wire springs 1521. Each catch 1520 engaged with a corresponding portion of the one or more wire springs 1521 such that the bias mechanism 1520 biases the catches 1530 outward to the projected positions thereof. The catch assembly 1500 may be installed to the spindle 114 as a modular unit in a manner analogous to that described above.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A catch assembly for selectively coupling a handle to a spindle, the catch assembly comprising:
- a holder;
- a pair of flexible arms extending longitudinally from the holder; and
- a pair of catches mounted to the pair of flexible arms such that each catch is biased toward a corresponding and respective projected position and operable to be moved to a corresponding and respective depressed position.

2. The catch assembly of claim 1, wherein the holder is annular about a longitudinal axis.

3. The catch assembly of claim 1, further comprising a pair of walls extending longitudinally from the holder.

4. The catch assembly of claim 3, wherein the pair of arms are separated from one another by the pair of walls.

5. The catch assembly of claim 3, wherein slots are formed between the pair of arms and the pair of walls.

6. The catch assembly of claim 3, wherein the walls are arcuate.

7. The catch assembly of claim 1, wherein the catch assembly is integrally formed as a monolithic structure.

8. A handleset comprising the catch assembly of claim 1, the handleset further comprising the handle and the spindle;
- wherein the catch assembly is mounted within the spindle; and
- wherein each catch is configured to engage the handle when in the projected position, and to disengage from the handle when in the depressed position.

9. A catch assembly, comprising:
- a holder;
- a first flexible arm extending longitudinally from the holder, the first flexible arm comprising a first catch that is biased to a first projected position by the first flexible arm; and a second flexible arm extending longitudinally from the holder, the second flexible arm comprising a second catch that is biased to a second projected position by the second flexible arm.

10. The catch assembly of claim 9, further comprising:

a first wall extending longitudinally from the holder and positioned between the first flexible arm and the second flexible arm; and a second wall extending longitudinally from the holder and positioned between the first flexible arm and the second flexible arm; and wherein the first wall and the second wall are opposite one another.

11. The catch assembly of claim 9, wherein the first flexible arm is integrally formed with the first catch as a first monolithic structure; and wherein the second flexible arm is integrally formed with the second catch as a second monolithic structure.

12. The catch assembly of claim 9, wherein the catch assembly is integrally formed as a monolithic structure.

13. A handleset comprising the catch assembly of claim 9, the catch assembly further comprising:

a spindle in which the catch assembly is seated; and a handle mounted to the spindle; and wherein the catch assembly prevents removal of the handle from the spindle when the first catch is in the first projected position and/or when the second catch is in the second projected position.

14. A catch assembly, comprising:

an annular collar extending about an axis and having a pair of flexible arms extending longitudinally along the axis; and a pair of catches mounted to the pair of flexible arms such that each catch is biased toward a projected position by a corresponding one of the flexible arms.

15. The catch assembly of claim 14, wherein the annular collar further comprises a plurality of slots defining the pair of flexible arms.

16. The catch assembly of claim 14, wherein the catch assembly is integrally formed as a monolithic structure.

17. An apparatus comprising the catch assembly of claim 14, the apparatus further comprising:

a housing configured for mounting to a door; and a spindle rotatably mounted to the housing; and wherein the catch assembly is mounted in the spindle.

18. The apparatus of claim 17, further comprising a handle, wherein the catch assembly selectively couples the handle to the spindle.

19. The catch assembly of claim 14, wherein the annular collar and the pair of flexible arms are integrally formed as a monolithic structure.

20. The catch assembly of claim 14, further comprising a pair of walls positioned between the pair of flexible arms and extending longitudinally along the axis.

* * * * *